United States Patent
Xiao et al.

(10) Patent No.: US 10,592,736 B2
(45) Date of Patent: Mar. 17, 2020

(54) METHOD AND SYSTEM FOR CSI-BASED FINE-GRAINED GESTURE RECOGNITION

(71) Applicant: HUAZHONG UNIVERSITY OF SCIENCE AND TECHNOLOGY, Wuhan, Hubei (CN)

(72) Inventors: Jiang Xiao, Hubei (CN); Yuxi Wang, Hubei (CN); Hai Jin, Hubei (CN); Mingxuan Ni, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 86 days.

(21) Appl. No.: 16/105,005

(22) Filed: Aug. 20, 2018

(65) Prior Publication Data
US 2019/0087654 A1  Mar. 21, 2019

(30) Foreign Application Priority Data
Sep. 15, 2017  (CN) .......................... 2017 1 0846518

(51) Int. Cl.
*G06K 9/00* (2006.01)
*G06K 9/03* (2006.01)
(Continued)

(52) U.S. Cl.
CPC ..... *G06K 9/00416* (2013.01); *G06K 9/00335* (2013.01); *G06K 9/00355* (2013.01);
(Continued)

(58) Field of Classification Search
CPC ........... G06K 9/00416; G06K 9/00335; G06K 9/00355; G06K 9/00422; G06K 9/00429; G06K 9/03; G06K 9/0051; G06K 2209/01
See application file for complete search history.

(56) References Cited

U.S. PATENT DOCUMENTS 6,956,968 B1 * 10/2005 O'Dell ................. G06F 3/0237
382/182
10,503,960 B2 * 12/2019 Hong ................. G06K 9/00181
(Continued)

FOREIGN PATENT DOCUMENTS

| CN | 105807935 | | 7/2016 |
| CN | 105844216 | | 8/2016 |
| CN | 105844216 A | * | 8/2016 |

*Primary Examiner* — Dominic E Rego
(74) *Attorney, Agent, or Firm* — Michael X. Ye; Morris, Manning & Martin, LLP

(57) ABSTRACT

The invention provides a method for CSI-based fine-grained gesture recognition, wherein the method comprises the following steps: determining a start point, an end point, a velocity, a direction and/or an inflection point of at least one stroke gesture in multiple dimensions according to an eigenvalue of channel state information; dividing the strokes according to the start point, the end point, the velocity, the direction and/or the inflection point of the stroke using a machine learning method and forming a stroke sequence; building a stroke decipherment model according to frequencies of the strokes appearing in natural language rules and/or scientific language rules and/or connection rules between the strokes; and dividing and recognizing the stroke sequence as a letter sequence, a radical sequence, a numeral sequence and/or a pattern sequence conforming to the natural language rules and/or the scientific language rules using the stroke decipherment model. The present invention involves recognizing strokes of characters from finger gesture, and then recovering characters from the strokes, so as to enrich types of languages that can be recognized from finger gesture and enhance recognition accuracy of gesture writing.

15 Claims, 5 Drawing Sheets

(51) Int. Cl.
*G06F 40/232* (2020.01)
*G06F 40/20* (2020.01)

(52) U.S. Cl.
CPC ..... *G06K 9/00422* (2013.01); *G06K 9/00429* (2013.01); *G06K 9/03* (2013.01); *G06F 40/20* (2020.01); *G06F 40/232* (2020.01); *G06K 9/0051* (2013.01); *G06K 2209/01* (2013.01)

(56) References Cited

U.S. PATENT DOCUMENTS

| | | | |
|---|---|---|---|
| 2004/0243389 A1* | 12/2004 | Thomas | G06F 3/018 704/1 |
| 2007/0136283 A1* | 6/2007 | Silverbrook | G06K 9/2054 |
| 2008/0134101 A1* | 6/2008 | Newman | G06F 3/03545 715/856 |

* cited by examiner

METHOD AND SYSTEM FOR CSI-BASED FINE-GRAINED GESTURE RECOGNITION

BACKGROUND OF THE INVENTION

1. Technical Field

The present invention relates to gesture recognition for the purpose of human-machine interaction, and more particularly to a method and a system for CSI-based fine-grained gesture recognition.

2. Description of the Related Art

In applications of smart human-machine interaction, such as virtual reality, effective and clear communication realized by recognizing and tracking human gesture has become a future trend and a research hotspot in both industrial and academic worlds. For achieving hand-writing input of text, there have been detection methods using acoustic equipment, visual equipment, radio frequency recognition equipment or sensors. However, existing handwriting text input systems based on these known methods are far from perfect. For example, some of these handwriting input recognition systems require users to write with a greater range of movements to accurately recognize the written content, and some require writing to be performed using particular writing equipment, which undermines convenience of use, while others are quite demanding in terms of writing equipment and environment.

With the development of wireless communication technology, more and more wireless devices are used in our daily life. Wireless communication technology not only allows wireless communication between devices, but also helps to recognize human action and gesture. Therefore, wireless communication technology is deemed feasible and useful for recognition of handwriting input. This method recognizes hand-written content by establishing the relationship between tracks of finger movement during writing and variation patterns of wireless signals and accordingly analyzing changes in strength or propagation channel of wireless signals. However, there are only few systems so far using wireless communication technology to process handwriting input, and these systems can only provide limited input functions.

China Patent No. CN 105807935 discloses a Wi-Fi-based gesture-controlled human-machine interaction system comprising: a signal collecting module that obtains channel state information (CSI) of a physical layer containing user's action from Wi-Fi signals; a signal processing module that processes the collected signals with operations of denoising, filtering and smoothing; a gesture action extraction module that performs gesture action information extraction according to signals obtained from the signal processing module; an action command mapping module that obtains gesture action data from the gesture action extraction module and maps the data into corresponding computer operation instructions. This prior patent is the first disclosure about a WiFinger gesture-sensing text input system based on wireless network signals. However, this known system can only use signals generated by wireless devices to input numeral text formed by different combinations of finger gestures, and it is unable to recognize hand-written English letters or words.

China Patent No. 105844216 A discloses detection and matching mechanism for recognition of handwritten letters using Wi-Fi signals characterized in that: 1) this is the first system of CSI application based on fine-grained handwritten letter recognizing; 2) the collected CSI data are effectively denoised; 3) it provides an effective solution for extraction of characteristic waveforms; 4) 26 files matching 26 handwritten letters are built by training samples; and 5) it improves recognition accuracy by providing a method for correcting contextual errors. The previous patent matches hand gestures with samples of 26 handwritten letters so as to achieve recognition of handwritten letters. However, the prior art has its limits lying in that it has to build samples corresponding to the letters before handwritten letters can be recognized, so the samples are quantitatively enormous, and that it is inapplicable to hand-written non-English letters, patterns or mathematical operators. Thus, the prior art is limited in its capability of recognizing hand-written contents and therefore cannot satisfy users' need for diverse handwritten contents.

For input recognition purposes, the objects to be recognized include not only letters, but also other forms of characters, such as Chinese characters, Korean characters, Japanese characters, digits, and the recognized characters have to be rebuilt into words or formulas. Therein, characters of Chinese. Korean and Japanese are structurally complicated, and there would be a huge number of waveforms mapped from and corresponding to samples of all characters to store. As to characters, numerals and patterns, strokes are their basic units and limited in number, so it is appropriate to use strokes as the basic unit for character recognition. Nevertheless, differences between hand-written strokes and standard strokes pose a problem. Particularly, in relatively unrestrained wireless environment, where users write in invisible space, the size and scale of hand-written strokes are hardly consistent or mutually comparable. Thus, accurate recognition of strokes of characters and patterns is technically challenging. For example, the two Chinese words "未" and "末" share the same combination of strokes, with the only difference lying on the lengths of the first and second strokes. Distinguishing the words "未" and "末" is much harder than identifying English words. In addition, how to accurately construct words or formulas with continuous strokes presents another technical challenge to overcome.

SUMMARY OF THE INVENTION

In view of the shortcomings of the prior art, the present invention provides a method for CSI-based fine-grained gesture recognition, characterized in that the method comprises the following steps: determining start point, end point, velocity, direction and/or inflection point of at least one stroke gesture in multiple dimensions according to an eigenvalue of channel state information; classifying strokes according to the start point, the end point, the velocity, the direction and/or the inflection points of the stroke gesture and forming a stroke sequence using machine learning methods; building a stroke decipherment model according to frequencies of the strokes appearing in natural language rules and/or scientific language rules and/or connection rules between the strokes; and dividing and recognizing the stroke sequence as a letter sequence, a radical sequence, a numeral sequence and/or a pattern sequence conforming to the natural language rules and/or the scientific language rules using the stroke decipherment model.

By recognizing characters from strokes, the present invention can advantageously reduce the number of waveform samples of different characters, and the fact that strokes can form various characters makes the disclosed method and system applicable to more types of languages. Particularly, the present invention determines the type and sequence of strokes according to information such as the velocity, the direction, the inflection points of the stroke gesture and the like, thereby improving accuracy of recognizing strokes and accuracy of building strokes into characters and formulas.

According to a preferred embodiment of the present invention, the method further comprises the following steps: building an error-correction model according to a logic sequence of the natural language rules and/or the scientific language rules, wherein the error-correction model evaluates and corrects the letter sequence, the radical sequence, the numeral sequence and/or the pattern sequence according to the logic sequence, and recognizing the letter sequence, the radical sequence, the numeral sequence and/or the pattern sequence as phrases, words, numeral codes and/or patterns arranged in order. The present invention uses the built error-correction model to correct the letters, radicals, numerals and/or patterns recognized by the stroke decipherment model, so as to obtain the correct letters, radicals, numerals and/or patterns. Preferably, plural recognized correct letters, radicals, numerals and/or patterns form letter sequences, radical sequences, numeral sequences and/or pattern sequences according to the stroke sequences. The error-correction model divides and composes the letters, radicals, numerals and/or patterns that are arranged in order to form correct phrases, words, numeral codes and/or patterns. The error-correction model corrects letters or words according to natural language logic rules, so as to not only solve the technical problem of correcting the wrong determination of the stroke decipherment model, but also output phrases, words, numeral codes and/or patterns that are correct and conform to language logic, thereby forming a sentence having a logic sequence.

According to a preferred embodiment of the present invention, the steps of determining the direction of the stroke gesture comprise: eliminating phase shift using a linear transformation method; selecting a signal that contains no multipath effects according to an arrival time of the signal; building a CSI data matrix and determining an arrival angle of the signal; and determining a direction of the velocity of the stroke gesture according to the arrival angle of the signal, a signal path and a stroke gesture displacement; wherein the linear transformation method for eliminating the phase shift is: determining a measured phase $\hat{\varphi}_i$ of $i^{th}$ an sub-carrier through $$\hat{\varphi}_i = \varphi_i - 2\pi \frac{k_i}{N}\delta + \beta + Z;$$

where $\varphi_i$ is a true phase, and $\delta$ is a clock skew at a receiving end of the signal with respect to a transmitting end of the signal, in which the phase shift generated correspondingly is $$-2\pi \frac{k_i}{N}\delta,$$

$\beta$ is a position constant phase shift, Z is measurement noise, $K_i$ is a serial number of the $i^{th}$ sub-carrier, and N is a magnitude of the fast Fourier transform;
defining $$b = \frac{1}{n}\sum_{j=1}^{n}\varphi_j = \frac{1}{n}\sum_{j=1}^{n}\varphi_j - \frac{2\pi\delta}{nN}\sum_{j=1}^{n}k_j + \beta,$$

where a frequency of the sub-carrier is symmetric, i.e., $$\sum_{j=1}^{n}k_j = 0,$$

b is simplified into $$b = \frac{1}{n}\sum_{j=1}^{n}\varphi_j + \beta;$$

and a linear term $ak_i+b$ is subtracted from the measured phase $\hat{\varphi}_i$, so as to eliminate phase shift caused by $\delta$ and $\beta$, thereby obtaining a linear combination of the true phase containing no noise Z, namely $$\tilde{\varphi}_i = \hat{\varphi}_i - ak_i - b = \tilde{\varphi}_i - \frac{\varphi_n - \varphi_1}{k_n - k_1}k_i - \frac{1}{n}\sum_{j=1}^{n}\varphi_j.$$

Since the measured phase of the CSI has serious phase shift from the true phase, the shift has to be removed first. The phase after linear transformation is more stable than the original phase in terms of distribution. While the result is not the true phase, it has no effects on the determination of the moving direction of the stroke gesture in the present invention. Even minor object movements are covered by the method for determining the velocity direction, so the present invention can rapidly determine directions of minor stroke gesture.

According to a preferred embodiment of the present invention, the method further comprises the following steps: establishing a mapping relationship between a variation pattern of the channel state information and the strokes; determining corresponding initial strokes according to the variation pattern of the channel state information; determining connection relationship between adjacent initial strokes according to start points, end points, velocities, directions and/or the inflection points of the initial strokes, thereby determining the true strokes and types of the true strokes according to the connection relationship.

In practical operation, similar strokes are similar in channel state information. Thus, determination of strokes only depending on variation patterns of channel state information may be incorrect. The present invention according to the mapping relationship between variation patterns of channel state information and strokes to initially determine the strokes, and then determine whether the connection relationship between the strokes and that of the initial strokes are consistent. Where the both are highly matched, the determination of the initial strokes is correct, and they are true strokes. The present invention uses the determination of connection relationship to support the determination of strokes instead of relying on initial strokes, so as to obtain correct strokes. The present invention thereby prevents wrong strokes of channel state information determination caused by irregular writing gesture.

According to a preferred embodiment of the present invention, the method comprises the following steps: determining a multi-dimensional stroke track of the strokes according to the start point, the end point, the stroke time, the velocity, the direction and/or the inflection points of the stroke gesture; and determining the true strokes and types thereof according to a matching level between the stroke tracks and the initial strokes. The stroke track obtained in the present invention using the start point, the end point, the stroke time, the velocity, the direction and/or the stroke points of the stroke gesture is the true track of the user's writing. By matching the stroke track with the initial strokes can rapidly determine the accuracy of the initial strokes, thereby simplifying verification of accuracy of the initial strokes and preventing wrong determination of the initial strokes. Particularly, matching between the stroke track and initial strokes is a mutual verification mechanism, where a high matching level demonstrates that both the initial strokes and the stroke track are correct. As compared to stroke determination using machine learning, the present invention using channel state information to determining initial strokes and perform verification is more accurate without compromising the efficiency of stroke determination.

According to a preferred embodiment of the present invention, where the matching level between the stroke track and the initial strokes is not smaller than a predetermined threshold, the initial strokes is determined as the true strokes; or where the matching level between the stroke track and the initial strokes is smaller than the predetermined threshold, stroke analysis is performed according to the start point, the end point, the velocity, the direction and/or the inflection points of the stroke gesture using a machine learning method, so as to determine the true strokes, and classify the strokes. The present invention selectively uses machine learning to determine strokes, thereby saving time for determination of relatively simple strokes. For relatively complex strokes, the present invention avoids the defect of error variation patterns of channel state information, thereby ensuring accuracy of stroke determination. Where the stroke track and the initial strokes do not match, the machine learning method is more favorable to quick stroke determination. Preferably, the present invention matches the second stroke determined using machine learning with the initial strokes. If the matching level is greater than the threshold, the initial strokes are true strokes. If the matching level is smaller than the threshold, the second stroke determined using machine learning is taken as the true stroke. In addition, the present invention establishes mapping relationship between the channel state information of the second stroke and the channel state information of the initial strokes, thereby correcting the mapping relationship between channel state information and the strokes. The present invention uses machine learning to add an automatic calibration mechanism that automatically calibrates the mapping relationship between channel state information and strokes during stroke determination.

According to a preferred embodiment of the present invention, the steps of extracting the eigenvalue of the channel state information comprise:
collecting first channel state information of at least one sub-carrier; processing the first channel state information into second channel state information by means of denoising and/or slicing; performing multi-dimensional measurement on the second channel state information; calibrating the second channel state information; and extracting an eigenvalue of variation in the second channel state information. Extraction of the eigenvalue is the key part of stroke determination, and provides crucial data for building characters from strokes. The present invention treat the channel state information with denoising and/or slicing, and calibrates the channel state information, so as to smooth the waveform of the channel state information, thereby making the channel state information accurate, reducing errors in the eigenvalue, and improving the accuracy in later extraction of the eigenvalue. Thus, multi-dimensional measurement does not miss channel state information, so the technical problem about incomplete channel state information can be solved.

According to a preferred embodiment of the present invention, the steps of extracting the eigenvalue of variation in the second channel state information comprise: performing inverse Fourier transform on at least one said second channel state information, and extracting an eigenvalue of at least one stroke gesture using a discrete wavelet transform method. The processing using inverse Fourier transform and discrete wavelet transform eliminates the interference from noise, thereby obtaining smooth waveforms of channel state information, correcting errors in the waveforms, and improving the accuracy of the eigenvalue. An accurate eigenvalue is the prerequisite for determining velocity, direction, inflection points of stroke gesture. Thus, the uses of inverse Fourier transform and discrete wavelet transform can solve the technical problems about inaccurate data and low recognition rate. The disclosed gesture recognition method can achieve high recognition accuracy of stroke gesture on the basis of accurate eigenvalues.

The present invention provides a system for CSI-based fine-grained gesture recognition, being characterized in that the system at least comprises: a signal acquisition module, an eigenvalue extraction module, a stroke classifying module, and a letter recognizing module, wherein the signal acquisition module collects channel state information (CSI), the eigenvalue extraction module extracts an eigenvalue of the channel state information; the stroke classifying module determines a start point, an end point, a velocity, a direction and/or an inflection point of at least one stroke gesture in multiple dimensions according to the eigenvalue of the channel state information, and the stroke classifying module classifies strokes according to the start point, the end point, the velocity, the direction and/or the inflection points of the stroke gesture using a machine learning method and forming a stroke sequence; the letter recognizing module has a stroke decipherment model built according to frequencies of the strokes appearing in natural language rules and/or scientific language rules and/or connection rules between the strokes; and the letter recognizing module determines a start point, an end point, a velocity, a direction and/or an inflection point of at least one stroke gesture in multiple dimensions according to the eigenvalue of the channel state information, and divides and recognizes the stroke sequence as a letter sequence, a radical sequence, a numeral sequence and/or a pattern sequence conforming to the natural language rules and/or the scientific language rules using the stroke decipherment model. The disclosed system for CSI-based fine-grained gesture recognition can accurately collect, denoise and slice the channel state information, so as to obtain waveforms that are smooth and with less inaccuracy, thereby obtaining accurate eigenvalues of stroke gesture. The stroke classifying module of the present invention can accurately differentiate similar strokes according to eigenvalues, and does not mix up features of strokes due to similarity between strokes. The letter recognizing module can divide and build stroke sequences, and build letters, words, numerals and/or patterns conforming to the rules of stroke connection without upsetting the user's input sequence. The disclosed system can prevent the effect of gravity on stroke gesture in wireless environment, so as to perform accurate recognition. The present invention builds strokes into letters that conform to language rules, and builds letters into words, phrases, numeral codes or patterns that are arranged in the input sequence and conform to language logic. The disclosed system not only accurately builds strokes into characters, but also has an automatic calibrating mechanism, with accuracy up to 98%.

According to a preferred embodiment of the present invention, the system further comprises an error-correction module, wherein the error-correction module has an error-correction model built according to logic sequences of natural language rules and/or scientific language rules, wherein the error-correction module evaluates and corrects the letter sequences, radical sequences, numeral sequences and/or pattern sequences according to the logic sequences, and recognizes the letter sequences, radical sequences, numeral sequences and/or pattern sequences as phrase, words, numeral codes and/or patterns that are arranged in order. The error-correction module of present invention can not only correct errors in the letter recognizing module according to language rules and language logic, but also further recognize information such as letters and radicals arranged in sequence as language contents, such as words and phrases. Preferably, the disclosed system has a calibrating mechanism for reducing errors, so the gesture content it recognizes and outputs conforms to language logic and is comprehensible to users, without the need of additional calibration.

Beneficial Effects of the Invention

With the present invention, a user need only existing or normal wireless network equipment to perform recognition of hand-written English letter and words, thereby achieving smart handwriting input. The present invention is designed to determine written English letter stroke by acquiring and analyzing variation patterns of wireless channel state information (CSI) during writing of different letter strokes, and provides a handwriting input method that builds English letters and words from strokes, so as to achieve English handwriting input. During writing, users can easily use fingers to perform stroke writing in a small area without carrying any specialized equipment. Thus, the present invention features high operability, low costs, and great potential of popularity.

DETAILED DESCRIPTIONS OF THE INVENTION

For further illustrating the means and functions by which the present invention achieves the certain objectives, the following description, in conjunction with the accompanying drawings and preferred embodiments, is set forth as below to illustrate the implement, structure, features and effects of the subject matter of the present invention.

In the present invention, channel state information (CSI) is information of the physical layer in the sub-carrier level, referring to the channel properties of a communication link. Channel state information (CSI) describes how a signal coming from a transmitting end arrives at a receiving end through air propagation, and reflects the attenuation coefficient of the signal along every transmission path.

The present invention is applicable to characters of various natural languages, such as Simplified Chinese, Traditional Chinese, English and Latin and the like, and also applicable to symbolic characters such as punctuation marks, geometric figures, mathematical formulas and chemical formulas that contain numbers and symbols.

In the present invention, the term "stroke" refers to strokes of characters, numeral stroke and pattern stroke.

In the present invention, a word refers to a single character while radicals comprise radical components forming a character.

Embodiment 1

Figure 1:
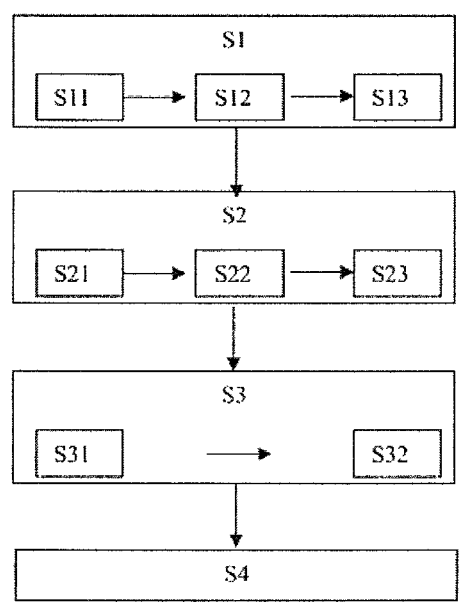
FIG. 1 is a logic diagram of a method for CSI-based fine-grained gesture recognition according to the present invention.

Referring to FIG. 1, the present invention provides a method for CSI-based fine-grained gesture recognition, comprising the following steps:
S1: collecting channel state information (CSI);
S2: extracting an eigenvalue of the channel state information;
S3: determining a type of a stroke according to connection between the eigenvalue and stroke gesture and building a stroke sequence; using a stroke decipherment model to recognize the stroke sequence as a letter sequence, radical sequence, numeral sequence and/or pattern sequence arranged according to logic rules; building an error-correction model according to natural language rules and/or scientific language rules to calibrate at least one letter sequence, radical sequence, numeral sequence and/or pattern sequence.

The steps of the disclosed method for CSI-based fine-grained gesture recognition are described in detail below.
S1: collecting channel state information (CSI).

The present invention uses the existing wireless network and equipment to recognize hand-written characters, numerals and patterns, thereby providing the function of smart text input.

In the present invention, the wireless receiving equipment comprises a wireless signal receiving device. The wireless signals may be signals transmitted over constant waves (e.g., RFID signals), fast-changing transmission signals (e.g., TV signals) or signals transmitted intermittently (e.g., Wi-Fi signals).

The example below explains the present invention with Wi-Fi signals. Preferably, a wireless network interface card is used to receive Wi-Fi signals. By modifying the kernel, the present invention can use low-cost, commercial wireless network interface card to acquire channel state information (CSI) in the form of sub-carriers transmitted through the orthogonal frequency-division carrier multiplexing technology.

Preferably, collecting channel state information comprises steps of S11 through S13.

S11: collecting a first channel state information of at least one sub-carrier.

For example, a wireless access point is taken as a transmitting end of Wi-Fi signals. The transmitting end transmits Wi-Fi signals to a receiving end equipped with an Intel iwl 5300 Card. Based on the orthogonal frequency-division carrier multiplexing platform of the physical layer of the wireless network, with the use of the multipath effect in complex indoor environment, a first channel state information of plural sub-carriers as exclusive identification can be acquired at the receiving end.

In the present invention, the first channel state information refers to the initially collected channel state information that has not received any treatment of any technical means.

Preferably, a wireless router and the wireless network interface card are both placed on a table with a distance therebetween kept between 1 and 2 meters. The closer the wireless router and the wireless network interface card are, the more accurate the resulting recognition of stroke gesture is. During writing, the user shall keep his/her hand writing in the line between the wireless router and the wireless network interface card, i.e., in the LOS (Line-Of-Sight) path of propagation of wireless signals. The exact position of the user in the path has no significant influence on the accuracy of stroke gesture determination.

Preferably, the channel state information of at least one sub-carrier is demodulated into the first channel state information.

During transmission of data pack in the orthogonal frequency-division carrier multiplexing system, wireless signals are demodulated and directly output to a decoder. The decoder decodes the wireless signals to obtain demodulated first channel state information of each sub-carrier, thereby calculating the amplitude and phase of signals corresponding to the first channel state information.

S12: performing denoising on the first channel state information.

Denoising channel state information may be achieved by denoising using a filter and/or using a matrix analysis method.

The present invention uses a low-pass Butterworth filter and the robust PCA method to perform denoising on the amplitude of the first channel state information. Since the Butterworth low-pass filter does not greatly distort the phase information of the original signal, and the bandpass has relatively large flat amplitude response, the signal phase variation caused by the stroke gesture can be reserved to a maximum extent. That is the reason a Butterworth low-pass filter is used for filtering the first channel state information. By setting reasonable parameters for the Butterworth low-pass filter, most high-frequency ambient noise in the signals can be removed.

If the filtered signal still contains some noise, the robust PCA method may be used for further denoising. As compared to traditional, classic PCA analysis, the robust PCA method implemented by the present invention is improved and can remove noise with enhanced efficiency while keeping effective information. The first channel state information denoised by the low-pass filter and the robust PCA method contains less noise, so the first channel state information is more accurate.

S13: slicing the denoised first channel state information using an adjustable threshold, so as to generate second channel state information.

Slicing is favorable to extraction of the eigenvalue of channel state information, thereby determining amplitude and phase of the second channel state information more clearly. In still environment, the second channel state information has a stable waveform, and movements of stroke gesture can cause significant changes in amplitude and phase of channel state information. The present invention uses slicing based on valuation of window scalability to acquire sections of the second channel state information corresponding to the process of writing a single stroke. The initial value of the threshold is set as:

$$Th_{init} = \begin{cases} \dfrac{\mu_w + \mu_s}{2}, & \text{if } \sigma_w = \sigma_s, \\ \max\left(\dfrac{(\mu_s \sigma_w^2 - \mu_w \sigma_s^2) \pm \sqrt{\Delta}}{\sigma_w^2 - \sigma_s^2}\right), & \text{if } \sigma_w \neq \sigma_s, \end{cases}$$

wherein, $\mu_\omega$ and $\sigma_\omega$ are the mean value and standard deviation of the gesture respectively in the stroke-writing state, $\mu_s$ and $\sigma_s$ are the mean value and standard deviation respectively when the gesture is in its still state.

S2: extracting an eigenvalue of the channel state information.

In the process of performing stroke gesture recognition, it is impossible to recognize the slices of the stroke gesture directly, and an eigenvalue has to be extracted for recognition.

Preferably, multi-dimensional measurement and calibration are performed on the second channel state information of the slices of the stroke gesture.

S21: performing multi-dimensional measurement on the second channel state information.

For example, three-dimensional measurement is performed on the second channel state information. Preferably, the channel state information is a three-dimensional matrix of Ntx×Nry×N (Ntx representing the number of transmitting antennas, Nry representing the number of reveiving antennas, and N in the third dimension representing the number of sub-carriers).

S22: calibrating the second channel state information.

Calibration is performed on the distorted channel state data to remove channel state data that lack for dimensions or have obviously incorrect data, thereby calibrating all data of the second channel state information and keeping the accurate channel state data.

S23: extracting the eigenvalue of variation of the second channel state information.

Preferably, the steps of extracting the eigenvalue of variation of the second channel state information comprise: performing inverse Fourier transform on at least one said second channel state information, and extracting the eigenvalue of at least one stroke gesture using the discrete wavelet transform method.

Particularly, inverse Fourier transform is performed on the calibrated second channel state information of the stroke gesture slices, and discrete wavelet transform is performed on the sectioned channel state information to extract the variation pattern of the channel state information and its eigenvalue of the stroke gesture.

Figure 9:
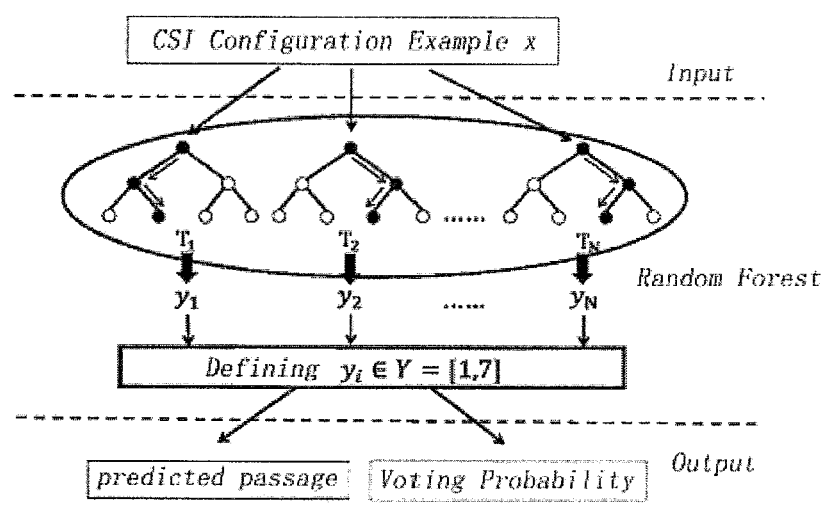
FIG. 9 is a logic diagram of the random forest algorithm according to the present invention.

According to a preferred embodiment of the present invention, connection relationship between stroke gesture and the variation pattern of channel state information is established. The present invention uses the random forest algorithm to perform training for the variation pattern of channel state information of known stroke gesture samples, so as to obtain a stroke decipherment model. The random forest algorithm is a multi-class classification algorithm, which can classify eigenvalues of channel states, corresponding to 7 predefined strokes. The class labels corresponding to the 7 strokes are defined as Y=[1,7], and N=500 decision trees T={$T_1, T_2, \ldots, T_N$} are selected to build the random forest, as shown in FIG. 9.

Section x in the test CSI represents one of the strokes, the random forest model asks each decision tree $T_i \in T$ to vote for the property labels y∈Y of Section X of the test CSI. After selecting all the N trees, the random forest classifies the test CSI Section x into one of the strokes by giving class prediction $C_{rf}^N(x)$ of majority voting of the 7 class labels of all the trees. Class prediction $C_{rf}^N(x)$ is calculated as $$C_{rf}^N(x) = \text{Majority}\{C_i(x)\}_1^N;$$

wherein $C_i(x)$ is prediction of the tree $T_i$. In addition to the predicted class label of the written stroke, the voting probability of the 7 strokes is obtained through the random forest method. Input the voting probability of the stroke class label y of the CSI Section x as $C_i(x)$=y, and divide it by the total amount of N, calculated as $$P_{rf}^N(x, y) = \frac{|\{C_i(x) = y\}_1^N|}{N}, y \in [1, 7].$$

For channel state information of an unknown handwritten stroke, the present invention first acquires the variation patterns of channel state information of the written stroke, and inputs it to the trained stroke decipherment model to obtain a classification result, thereby achieving determination of the handwritten letter stroke.

According to a preferred embodiment, the present invention can also determine feature data of stroke gesture according to the mean value, standard deviation, mean absolute deviation and/or maximum of the second channel state information. The class of the stroke gesture can be determined according to the feature data.

The mean value can better reflect the central tendency of channel state data. The standard deviation can measure the dispersion of channel state data. The mean absolute deviation can determine the mean absolute deviation of the sequence of channel state data. The maximum can reflect the level of the extreme value. Through discrete wavelet transform (DWT), a dispersed CSI amplitude segment x having a length of N in $l^2(Z)$ can be represented using the approximate value g and the wavelength h:

$$x_i = \frac{1}{\sqrt{N}} \sum_k \alpha(j_0, k) g_i^{(j_0,k)} + \frac{1}{\sqrt{N}} \sum_{j=j_0}^{\infty} \sum_k \beta(j, k) h_i^{(j,k)},$$

wherein $j_0$ is an arbitrary value, $$l^2(Z) = \left\{ x_i \,\bigg|\, \sum_{i=-\infty}^{\infty} |x_i|^2 < \infty \right\}.$$

Discrete wavelet transform (DWT) decomposes the original CSI signal into approximation coefficients and detail coefficients. The present invention uses approximation coefficients to perform feature extraction because they describe the shape of the signal maintaining the CSI variation pattern. Since basic wavelet functions {$g_i^{(j_0,k)}$}k∈Z and {$h_i^{(j,k)}$}(j,k) ∈$Z^2$, j≥$j_0$ are always such selected that they are orthogonal to each other, the approximation coefficient α and detail coefficient are respectively calculated as:

$$\alpha(j_0, k) = \frac{1}{\sqrt{N}} \sum_i x_i g_i^{(j_0,k)},$$

$$\beta(j, k) = \frac{1}{\sqrt{N}} \sum_i x_i h_i^{(j,k)}, j \geq j_0.$$

Preferably, the present invention determines the start point, end point, direction, velocity, acceleration and/or inflection points of the stroke gesture according to the eigenvalue of the stroke gesture. Where the velocity of the stroke gesture is predetermined as uniform, the present invention may omit collection and calculation for velocity and acceleration of the stroke gesture.

The present invention determines the direction, velocity and inflection points of the stroke gesture through the following process.

The present invention calculates the velocity of the stroke gesture using the eigenvalue of the channel state information in the way shown below.

Based on analysis of the collected and data-processed second channel state data, the energy of the channel state data comprises static CSI energy and dynamic CSI energy.

$$|H(f, t)|^2 = \sum_k 2|H_s \alpha_k(f, t)| \cos\left(\frac{2\pi v_k t}{\lambda} + \frac{2\pi d_k(\theta)}{\lambda} + \varphi\right) +$$

$$\sum_{k,l} 2|\alpha_k(f, t) \alpha_l(f, t)| \cos\left(\frac{2\pi(v_k - v_l)t}{\lambda} + \frac{2\pi(d_k(\theta) - d_l(\theta))}{\lambda} + \varphi_{kl}\right) +$$

$$\sum_k |\alpha(f, t)|^2 + |H(f)|^2$$

Figure 3:
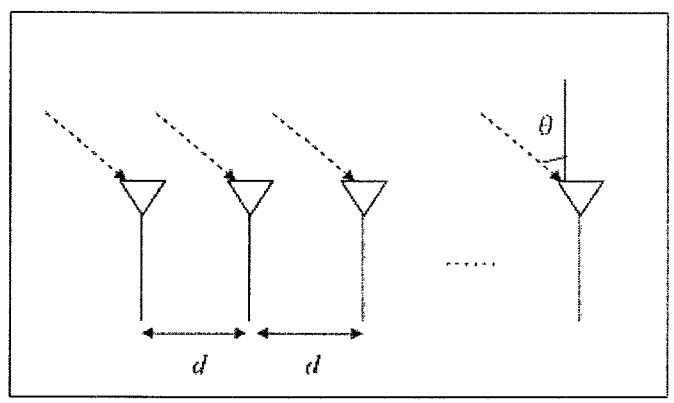
FIG. 3 schematically depicts an antenna matrix receiving wireless information according to the present invention.

The time domain information of the channel state information is converted into frequency domain information through the inverse Fourier transform, and the velocity of the stroke gesture is determined according to the relationship between frequency and wavelength as:

$$v = \frac{1}{2}\lambda f,$$

wherein, λ represents the magnitude of the wavelength, and f represents the frequency of the sub-carrier. As shown in FIG. 3, θ is an incidence angle where the antenna receives wireless signals.

The velocity variation and acceleration of the stroke gesture is determined according to the velocity and time of the stroke gesture. According to the velocity variation of the stroke gesture, it is determined whether the stroke gesture turns or stops at the inflection points.

The present invention determines the direction of stroke gesture in the way described below. Through determining the direction of stroke gesture, the present invention records changes in the direction of stroke gesture, so as to support determination of inflection points.

The direction of the velocity of stroke gesture is determined by:
eliminating phase shift using a linear transformation method;
selecting a signal that contains no multipath effects according to an arrival time of the signal;
building a CSI data matrix and determining an incidence angle of the signal: and
determining a direction of the velocity of the stroke gesture according to the incidence angle of the signal, signal path and stroke gesture displacement.
Wherein the method of using the linear transformation method to eliminate phase shift includes:
determining a measured phase $\hat{\varphi}_i$ of an sub-carrier through $$\hat{\varphi}_i = \varphi_i - 2\pi \frac{k_i}{N}\delta + \beta + Z.$$

Therein, $\varphi_i$ is a true phase, and $\delta$ is a clock skew at a receiving end of the signal with respect to a transmitting end of the signal, in which the phase shift generated correspondingly is $$-2\pi \frac{k_i}{N}\delta,$$

$\beta$ is a position constant phase shift, Z is measurement noise, $K_i$ is a serial number of the $i^{th}$ sub-carrier, and N is a magnitude of FFT. In the present invention, the serial number of the sub-carrier ranges between −28 and 28. Due to the existence of unknown phase shift, it is impossible to figure out the true phase shift only relying on a commercial interface card.

For eliminating the effects of random phase shift, linear transformation is performed on the measured phase.
The first step is to define $$a = \frac{\widehat{\varphi_n} - \widehat{\varphi_1}}{k_n - k_1} = \frac{\varphi_n - \varphi_1}{k_n - k_1} - \frac{2\pi}{N}\delta;$$

$$b = \frac{1}{n}\sum_{j=1}^{n}\varphi_j = \frac{1}{n}\sum_{j=1}^{n}\varphi_j - \frac{2\pi\delta}{nN}\sum_{j=1}^{n}k_j + \beta;$$

wherein the frequency of the sub-carrier is symmetric, i.e., $$\sum_{j=1}^{n}k_j = 0,$$

b is simplified into $$b = \frac{1}{n}\sum_{j=1}^{n}\varphi_j + \beta;$$

and a linear term $ak_i+b$ is subtracted from the measured phase $\hat{\varphi}_i$, so as to eliminate phase shift caused by $\delta$ and $\beta$, thereby obtaining a linear combination of the true phase containing no noise Z (ignoring the measurement noise Z), namely $$\tilde{\varphi}_i = \hat{\varphi}_i - ak_i - b = \tilde{\varphi}_i - \frac{\varphi_n - \varphi_1}{k_n - k_1}k_i - \frac{1}{n}\sum_{j=1}^{n}\varphi_j.$$

After unknown phase shift is removed, the stably distributed phase can be obtained and used as an effective characteristic.

In addition to phase shift, the multipath effects on CSI data have to be removed.

In the present invention, signal variation caused by movement process of stroke gesture is extracted from the signal received at the receiving end. This signal variation is also called as stroke gesture path signal. The stroke gesture path signal has the characteristic that a wireless signal reflected by stroke gesture is directly received by the receiving end without any more reflection so the wireless signal arrives in the minimal time. The present invention performs determination according to the receiving time of wireless signals, and selects the minimal arrival time of the wireless signal, thereby eliminating multipath effects and obtaining the stroke gesture path signal.

An antenna matrix array is built using the time sequence data of the 30 sub-carriers in the CSI data.

$$\begin{bmatrix} CSI_{1,1} \\ \vdots \\ CSI_{1,30} \\ CSI_{2,1} \\ \vdots \\ CSI_{2,30} \\ CSI_{3,1} \\ \vdots \\ CSI_{3,30} \end{bmatrix} = \begin{bmatrix} CSI_{1,1} & \ldots & CSI_{1,16} & CSI_{2,1} & \ldots & CSI_{2,16} \\ \vdots & \vdots & \vdots & \vdots & \vdots & \vdots \\ CSI_{1,16} & \ldots & CSI_{1,30} & CSI_{2,16} & \ldots & CSI_{2,30} \\ CSI_{2,1} & \ldots & CSI_{2,16} & CSI_{3,1} & \ldots & CSI_{3,16} \\ \vdots & \vdots & \vdots & \vdots & \vdots & \vdots \\ CSI_{2,16} & \ldots & CSI_{2,30} & CSI_{3,16} & \ldots & CSI_{3,30} \end{bmatrix}.$$

The MUSIC algorithm is used to obtain the incidence angle between stroke gesture and signals:

$$P_{mu}(\theta, \tau) = \frac{1}{aH(\theta, \tau)EEH_a(\theta, \tau)}.$$

The present invention determines the direction of the stroke gesture according to the incidence angles among the wireless signal transmitting end, at least two wireless signal receiving ends, stroke gesture and signals.

Figure 4:
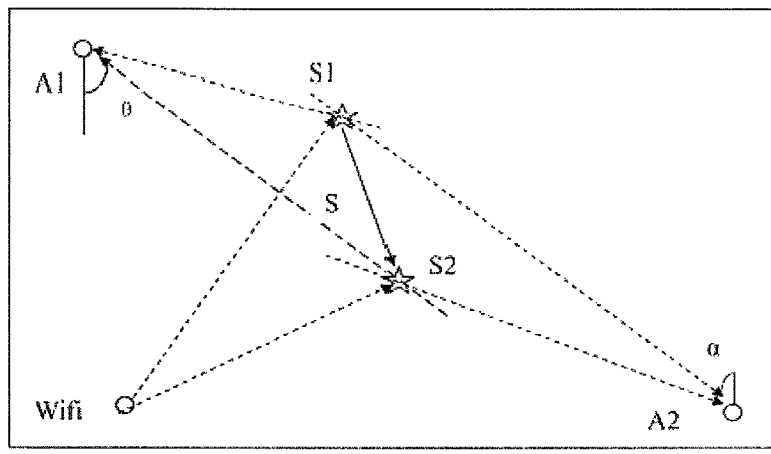
FIG. 4 schematically depicts monitoring of a moving direction of stroke gesture according to the present invention.

As shown in FIG. 4, the arrowed dotted lines represent Wi-Fi signals, the arrowed solid line represents the moving direction of the stroke gesture, and the dotted lines represent the reflection paths of the wireless signals. When the stroke gesture is moving, the Wi-Fi signals reflected by hand are received by the Wi-Fi signal receiving ends A1 and A2, respectively. The antenna incidence angle of the receiving end A1 is θ. The antenna incidence angle of the receiving end A2 is α. The extended lines of the receiving signals of the receiving ends A1 and A2 are intersect at a point S1, so the position of the stroke gesture in the current state is determined as S1. As shown in the drawing, the hand moves from S1 to S2 in a direction S. When the stroke gesture continuously has positional changes during its movement, the Wi-Fi signal generator continuously transmits Wi-Fi signals. The Wi-Fi signals reflected by the stroke gesture are continuously received by at least two receiving ends, so as to allow continuous determination of the moving direction and inflection points of the stroke gesture.

Preferably, writing strokes corresponding to the stroke gesture is determined by comprehensively referring to the time, velocity, direction and/or inflection points of the stroke gesture.

For example, the English letter "L" requires two strokes, "|" and "—", so the stroke movement has one inflection point. According to the velocity variation of the two strokes gesture when the inflection point appears and the time interval between the end point of the first stroke and the start point of the second stroke, it is determined that the two strokes are connected, but not two separate strokes.

Preferably, for basic stroke types of characters, numerals and patterns, the waveform and inflection points of the corresponding basic stroke samples are classified and stored. The advantage of storing these basic stroke samples is that the number of samples to be stored is reduced. For example, many of the 26 English letters contain the stroke "—". For them, the present invention only needs to save one stroke "—", and this and other strokes can be combined according to natural or scientific language rules to form letters, words, regular patterns or formulas. The present invention may form more letters, words and numerals without saving the waveform samples for all characters. This not only saves storage space, but also improves recognition rate of strokes and characters.

S3: determining the type of stroke according to the mapping relationship between the eigenvalue and the stroke gesture, and building a stroke sequence; using the stroke decipherment model to recognize the stroke sequence as a letter sequence, a radical sequence, a numeral sequence and/or a pattern sequence arranged according to logic rules.

Preferably, a mapping list between stroke gesture waveforms and strokes is established according to the CSI data sample of the stroke gesture, so as to establish the mapping relationship between the stroke gesture waveforms and the strokes. Thereby, the type of the stroke can be determined according to the eigenvalues of the waveforms of the stroke gesture.

Preferably, the type and sequence of the stroke are determined using machine learning method according to the connection relationship between the eigenvalues and the stroke gesture.

For example, there are 26 letters in English, but all these letters are formed by only 7 kinds of strokes. The 7 strokes forming English letters written by a user at the writing position are collected. The user writes each stroke with his/her finger for at least 50 times. The channel state information corresponding to every stroke is collected, and the second channel state information is obtained by denoising and slicing the channel state information and extracting its eigenvalue, then the second channel state information is used for performing sample training by the random forest method so as to obtain a stroke decipherment model. The stroke decipherment model is used to classify the stroke gesture.

Preferably, the present invention may further classify stroke gesture of written letters according to the HMM (Hidden Markov Model) algorithm. The HMM method enables the machine to quickly recognize strokes, thereby improving efficiency and accuracy of stroke recognition. Preferably, the sequence of the strokes is determined according to the input sequence of the stroke gesture waveforms.

Typically, the HMM model $\lambda$ is composed of three parts and defined as $\lambda=(\pi, A, B)$. The three parameters in $\lambda$ correspond to the initial distribution probability of hidden states, the transition probability matrix of hidden states, and the arrangement probability matrix, respectively. In the present invention, the initial distribution probability of hidden states represents the prior probability of different strokes, namely $\pi_i=P(s_i)$, $i \in [1,8]$, and by counting the frequency of the first stroke in the character set, CH={A, B, . . . Z} can be obtained. Every element in the transition probability matrix $A_{i,j}$ represents the probability of the stroke $s_i$ being written when the previous stroke is $s_j$, namely $A_{i,j}=P(s_i|s_j)$, $i,j \in [1,8]$. Similarly, the probability matrix may be obtained by compile statistics of all the characters. In the arrangement probability matrix, every element represents the probability of getting a certain observation (CSI section) $B_{k,i}$ when the hidden state is $s_i$, namely $B_{k,i}=P(O_k|s_i)$, $k \in [1,n]$, $i \in [1,8]$. Assuming that all the parameters of the HMM are known, for the foregoing observation sequence $O=o_1 o_2 \ldots o_n$, the corresponding stroke sequence may be estimated by calculating $\mathrm{argmax}_s P(S=s_1 s_2 \ldots s_n|o_1 o_2 \ldots o_n, \lambda)$.

Since 8 strokes of a given signal section get voting probability, $P(s_i|o_k)=\tilde{P}_{rf}(o_k, i)$, $i \in [1,8]$ uses the random forest method in the previous step. The present invention modifies the HMM model and uses it to get all feasible stroke sequences $S's \in CH$ that have confidence probability but not the optimal S. According to Bayes' Theorem, the probability $P(o_k|s_i)$ is estimated as $$P(o_k | s_i) = \frac{P(s_i | o_k) \times P(o_k)}{P(s_i)} \quad (1)$$

wherein $P(o_k)$ and $P(s_i)$ represent a given observation value and the prior probability of a certain passage respectively. Hence, the observation sequence $O = o_1 o_2 \ldots o_n$ is given. The probability of generating these observations for some feasible sequence of hidden states may be calculated as $$P(S = s_1 s_2 \ldots s_n | O = o_1 o_2 \ldots o_n, \lambda) = \quad (2)$$
$$P(s_1) \times \prod_{i=1}^{n} P(o_i | s_i) \times \prod_{i=1}^{n-1} P(o_{i+1} | s_i)$$

By substituting $P(O_i|s_i)$ in the above equation into Equation 1, an equation can be obtained as Equation 2

$$P(S = s_1 s_2 \ldots s_n | O = o_1 o_2 \ldots o_n, \lambda) = \quad (3)$$
$$P(s_1) \times \prod_{i=1}^{n} \frac{P(o_i | s_i) \times P(o_i)}{P(s_i)} \times \prod_{i=1}^{n-1} P(s_{i|1} | s_i)$$

For calculating the confidence level of every stroke sequence of the given observation value, the present invention summarizes the capacity probability of every S calculated using the foregoing equations, and uses the softmax function to normalize the probability of every S as $$\hat{P}(S | O, \lambda) = \frac{P(S | O, \lambda)}{\sum_{S \in CH} P(S | O, \lambda)} \quad (4)$$

Although in the foregoing derivation the prior probability $P(o_k)$, $k \in [1,n]$ is unknown, fortunately, in the step of normalization in Equation 4, all the unknown probability can be removed. After the normalized probability of all the feasible stroke sequences is obtained, namely the confidence level probability of all candidate characters in the CSI section sequence, the character can be determined by selecting the one having the greatest normalized probability.

For example, the input sequence of the stroke gesture is "/" and "V", so the recognized stroke sequence is first "/" and then "V".

Preferably, according to the type, velocity, direction, inflection points and/or sequence of the stroke, at least one stroke sequence corresponding to individual letters, individual radicals, individual numerals and individual patterns is built.

Every letter, radical or pattern is formed by at least one stroke. Therefore, according to the type and sequence of strokes, the connection relationship between strokes can be preliminarily determined, thereby forming the stroke sequence corresponding to individual letters, individual radicals, individual numerals, and individual patterns.

S31: building a stroke decipherment model according to the appearing frequency in natural languages, direction, velocity, and inflection points of the strokes or connection rules between the strokes.

A stroke decipherment model that can recognize strokes into individual letters, individual words and patterns is built according to the stroke sequence, appearing frequency, direction, velocity, and inflection points of the strokes or connection rules between the strokes. Preferably, the stroke decipherment model comprehensively estimates the connection relationship between the strokes according to the sequence, direction, velocity, inflection points of the strokes, and determines the connection relationship between the strokes according to connection rules of strokes, thereby forming the stroke sequence into complete letters, words or patterns. Preferably, the stroke decipherment model determines the track of the strokes according to the velocity, direction and inflection points of the strokes, and determines stroke connection relationship according to the track of the strokes. Some letters have similar strokes. For example, "D" and "b" are composed of similar strokes, namely one vertical stroke and a semicircular stroke. The only difference lays on the magnitude of the semicircular part. Thus, the stroke decipherment model determines the letter to be recognized is a or a according to the relative position between start point of the track of the semicircular stroke and the track of the vertical stroke.

S32: building an error-correction model according to natural language rules and/or scientific language rules to calibrate at least one letter sequence, word sequence, numeral sequence and/or pattern sequence.

Preferably, an error-correction model is built. The error-correction model organizes the letter sequence, word sequence, numeral sequence and/or pattern sequence into words, phrases or formula patterns, and performs calibration.

The letter sequence, word sequence, numeral sequence and/or pattern sequence output by the stroke decipherment model may have recognition errors. For example, a letter may be recognized as another letter having similar strokes.

The error-correction model combines the letter sequence, word sequence, numeral sequence and/or pattern sequence according to natural language rules and/or scientific language rules, so as to combine letter sequences into words, combine word sequences into phrases, and combine numerals and patterns into formulas.

Preferably, the error-correction model calibrates the letters, words, numerals, and patterns according to natural language rules and/or scientific language rules. Preferably, the error-correction model calibrates the letters, words, numerals, and patterns according to natural language rules, scientific language rules and logic rules.

For example, when a lowercase "a" and a lowercase "d" are written using similar movements, the stroke decipherment model may be only able to differentiates according to velocity and direction. However, the language model can provide the information that the character sequence "and" has greater probability than the character sequence "dnd", because "and" is a frequently used English word, while "dnd" has no meaning in English. The error-correction model may be used to correct recognition of the corresponding characters.

The error-correction model based on natural language rules may provide information about word sequences. For example, the word sequence "be my guest" has greater probability than the word sequence "be my quest". The two sequences are only different for their letters "g" and "q", and it is hard to tell them apart. The appearing frequency of word sequences can positively affect recognition of correct characters and words.

After the error-correction model is built successively, samples of stroke gesture waveforms and samples of stroke gesture movement information are used to train the stroke decipherment model and the error-correction model, thereby improving efficiency of stroke gesture recognition.

According to a preferred embodiment of the present invention, the disclosed method further comprises the following steps: establishing a mapping relationship between a variation pattern of the channel state information and the strokes. According to the variation pattern of the channel state information, the corresponding initial stroke is determined. According to the start point, the end point, the velocity, the direction and/or the inflection points of the stroke, the connection relationship between successive initial strokes is determined, thereby determining the true strokes and types of the true strokes according to the connection relationship. This process can advantageously ensure accuracy of stroke recognition and reduce error rate.

Preferably, the disclosed method further comprises the following step: determining a multi-dimensional stroke track of the stroke according to the start point, end point, stroke time, velocity, direction and/or inflection points of the stroke gesture.

Preferably, the present invention encodes strokes according to the start point, end point, velocity, direction and inflection points of stroke gesture for stroke recognition. FIG. 5 through FIG. 8 illustrate examples of the basic tracks of the sequence forming strokes. The labels used in the drawings can be read in the following way. Left to the colon the line type is encoded, wherein "s" represents a straight stroke and "c" represents a curved stroke. A curved stroke refers to a circular arc with a central angle of 90 degrees. Right to the colon the start and end of the respective portion is encoded in a "from-to" format, wherein "c" represents center, "u" represent upward, "d" represents downward, "r" represents right, "I" represents left. Thereby, the present invention is able to differentiate between stroke tracks with different granularities.

Figure 5:
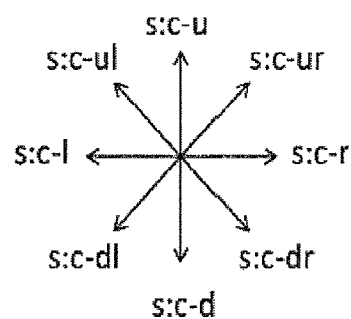
FIG. 5 shows possible directions of stroke gesture according to the present invention.
Figure 6:
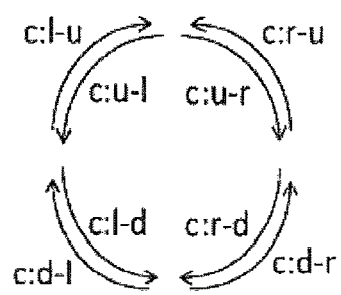
FIG. 6 is a schematic drawing showing curves in upper left, upper right, lower left, and lower right directions according to the present invention.
Figure 7:
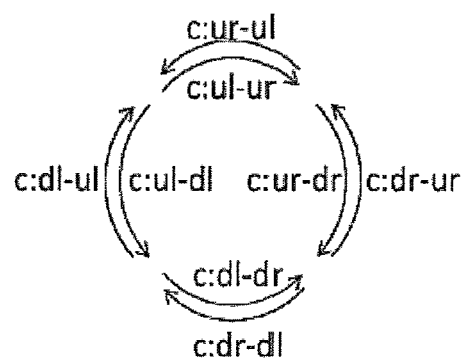
FIG. 7 is a schematic drawing showing curves in up, down, left, right directions according to the present invention.
Figure 8:
FIG. 8 shows a partial sequence of strokes for writing the letter "B" according to the present invention.

As shown in FIG. 5, s: c-l represents a straight line started from the center and ended at the left. s: c-dr represents a straight line started from the center and ended at the lower right. As shown in FIG. 6, c: l-u represents an upward curved line started from the left (toward the right). c: r-d represents a curved line started from the right and ended at the right (toward the left). As shown in FIG. 7, c: dl-ul represents a curved line started from the lower left and going to the upper left. c: dl-dr represents a curved line started from the lower left and the lower right. As shown in FIG. 8, the component sequence of the movement of the letter B can be expressed as: "s: c-d, s: c-u, c: u-r, c: r-d, c: u-r, c: r-d".

Preferably, the present invention encodes the strokes according to the acceleration, direction and inflection points of the stroke gesture for stroke recognition.

The letter "A" is herein taken as an example. The component sequence of strokes of the letter "A" is expressed as: "s: c-ur, s: c-dr, s: c-ul, s: c-r". Through calculation of velocity variation of the stroke gesture made by the antenna matrix, the acceleration of the stroke gesture is obtained. The acceleration data provide important reference that improves accuracy of hand-writing recognition. For example, when a user writes the letter "A" in the air, the acceleration data can be used to accurately measure the velocity variation and direction variation of the stroke gesture, thereby determining the stroke track of the stroke gesture in the three-dimensional space.

Preferably, the present invention uses the normalization method to process stroke tracks, so as to normalize non-standard stroke tracks into standard stroke tracks, thereby facilitating stroke recognition.

Preferably, true strokes and their stroke types are determined according to matching level between the stroke tracks and the initial strokes. This step is advantageous because if the stroke tracks highly match the initial strokes, the step of performing recognition according to the characteristics of the stroke such as velocity and direction can be simplified, thereby improving efficiency of recognition and classification of strokes, without undermining accuracy of stroke recognition.

Preferably, the disclosed method further comprises the following step: where the matching level between the stroke track and the initial strokes is not smaller than a predetermined threshold, determining the initial strokes as the true strokes; where the matching level between the stroke track and the initial strokes is smaller than the predetermined threshold, performing stroke analysis according to the start point, the end point, the velocity, the direction and/or the inflection points of the stroke gesture using a machine learning method, determining the true strokes, and classifying the strokes. This step is advantageous because it selects a stroke recognition method that is appropriate to current needs, so as to not only improve accuracy of stroke recognition, but also save time for stroke recognition.

S4: performing overall training for letter recognition and error-correction recognition using stroke gesture samples, so that the present invention can rapidly recognize the character information of stroke gesture.

Preferably, the error-correction model performs training using machine learning, thereby fast calibrating the recognized characters, numerals or patterns.

Embodiment 2

This embodiment is further improvement of Embodiment 1, and those details having been described previously are not repeated herein.

In the present embodiment, the word "HI" is taken as an example for explaining recognition of stroke gesture.

In the word "HI", the letter "H" is composed of strokes "|, —, |", and the letter "I" is formed by the stroke "|". Each of the strokes takes one second for its writing. The time interval between two successive strokes of the same letter is 2 seconds. The time interval between the two letters is 5 seconds. The user keeps the gesture still during these intervals.

After receiving all channel state information of the written word "HI", the wireless network interface card treats the CSI with denoising and slicing, and uses the discrete wavelet transform to extract characteristics of channel state information corresponding to every stroke, thereby forming the variation patterns of channel state information corresponding to each stroke. For the word "HI", 3 patterns corresponding to the letter "H" and 1 pattern corresponding to the letter "I" are collected. All the patterns are input into the stroke decipherment model in sequence for classification, thereby obtaining the possible probability of every pattern corresponds to every stroke.

The present invention compiles statistics of the appearance frequency of every stroke and the connection rules between strokes of English letter, and builds the stroke decipherment model according to the Hidden Markov Model (HMM), so as to achieve conversion between strokes and letters, and obtain the first two most possible letters among the letters corresponding to the series of strokes for writing the letter as the possibly determined correct letters. For example, the letter "H" may be determined as the letter and the letter and the letter "I" may be determined as the letter "I" and the letter "C". The letters are then combined to obtain possible letter sequences. In this case, the possible letter combinations are "HI", "GI", "HC" and "GC". Then the letter combinations are compared to words existing in the dictionary, thereby determining and recognizing that the word written by the user is "HI".

Embodiment 3

This embodiment is further improvement of Embodiments 1 and 2, and those details having been described previously is not repeated herein.

The present embodiment provides a system for CSI-based fine-grained gesture recognition. It is characterized in that the system at least comprises: a signal acquisition module 10, an eigenvalue extraction module 30, a stroke classifying module 40 and a letter recognizing module 50. The signal acquisition module 10 collects channel state information CSI. The eigenvalue extraction module 30 extracts an eigenvalue of the channel state information. The stroke classifying module 40 according to the eigenvalue of channel state information determines a start point, an end point, a velocity, a direction and/or an inflection point of at least one stroke gesture in multiple dimensions, and the stroke classifying module 40 uses machine learning to classify strokes according to the start point, the end point, the velocity, the direction and/or the inflection points of the stroke gesture, thereby forming a stroke sequence. The letter recognizing module 50 has a stroke decipherment model built according to frequencies of the strokes appearing in natural language rules and/or scientific language rules and/or connection rules between the strokes. The letter recognizing module 50 according to the eigenvalue of channel state information determines a start point, an end point, a velocity, a direction and/or an inflection point of at least one stroke gesture in multiple dimensions, and uses the stroke decipherment model to divide and recognize the stroke sequence as a letter sequence, a radical sequence, a numeral sequence and/or a pattern sequence conforming to the natural language rules and/or the scientific language rules.

Preferably, the system further comprises an error-correction module 60. The error-correction module 60 has an error-correction model built according to logic sequence of natural language rules and/or scientific language rules. The error-correction module 60 according to the logic sequence evaluates and corrects the letter sequence, the radical sequence, the numeral sequence and/or the pattern sequence, and recognize the letter sequence, the radical sequence, the numeral sequence and/or the pattern sequence into phrases, words, numeral codes and/or patterns arranged in order.

Preferably, the disclosed system for CSI-based fine-grained gesture recognition further comprises a signal processing module 20.

Figure 2:
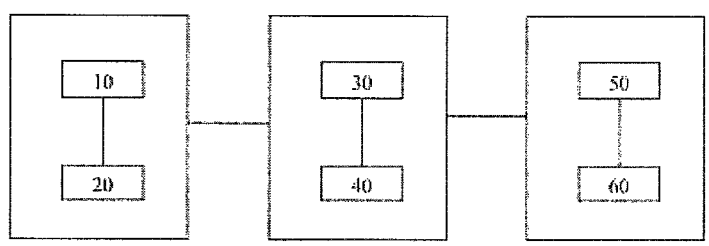
FIG. 2 is a module diagram of a system for CSI-based fine-grained gesture recognition according to the present invention.

As shown in FIG. 2, the signal acquisition module 10 is connected to the signal processing module 20. The signal processing module 20 is connected to the eigenvalue extraction module 30. The eigenvalue extraction module 30 is connected to the stroke classifying module 40. The stroke classifying module 40 is connected to the letter recognizing module 50. The letter recognizing module 50 is connected to the error-correction module 60. The error-correction module 60 outputs the recognized phrases, words, numerals or patterns.

Preferably, the signal processing module 20 performs denoising and slicing on the channel state information collected by the signal acquisition module 10. The signal processing module 20 sends the second channel state information after denoising and slicing to the eigenvalue extraction module 30. The eigenvalue extraction module 30 performs multi-dimensional measurement and signal calibration on the second channel state information, and performs eigenvalue extraction. Preferably, the eigenvalue extraction module 30 extracts the eigenvalue of the waveform of the stroke gesture. Preferably, the eigenvalue comprises the mean value, standard deviation, mean absolute deviation and/or maximum of the waveform of the stroke gesture. Preferably, the eigenvalue further comprises the incidence angles where at least two receiving ends receive wireless signals.

The stroke classifying module 40 has a stroke decipherment model. The stroke classifying module 40, according to the information transmitted by the eigenvalue extraction module 30, recognizes the type, velocity, direction and inflection points of the stroke gesture. Preferably, the stroke classifying module 40 determines the type of the stroke and stroke sequence according to the velocity, direction and inflection points of the recognized stroke gesture.

The letter recognizing module 50, according to the stroke sequence, connection rules of the stroke and the appearance frequency of the strokes, combines the strokes recognized by the stroke classifying module 40 and recognizes the combinations as letter sequences, word sequences, numeral sequences and/or pattern sequences.

The error-correction module 60 has an error-correction model. The error-correction module 60 calibrates the letter sequence, word sequence, numeral sequence and/or pattern sequence transmitted by the letter recognizing module 50, and according to natural language rules and/or scientific language rules, recognizes the letter sequence into at least one word, recognizes the word sequence into at least one phrase, recognizes the numeral sequence into at least one number, and recognizes the pattern sequence into at least one pattern. Preferably, the error-correction model 60, according to the mixed sequence of numerals and patterns, recognize the input as a mathematical formula or a chemical formula.

The disclosed system for CSI-based fine-grained gesture recognizes strokes by collecting stroke gesture information, and then recognizes character information according to stroke sequences. The present invention is advantageous because it helps to enrich the languages and patterns that can be recognized, and outputs diverse language characters or numeral patterns. The present invention recognizes characters based on the velocity, direction and inflection points of stroke gesture, so as to improve recognition accuracy and decrease miss rate. The present invention supports a recognition rate up to 98% or greater.

For example, the stroke decipherment module recognizes the stroke gesture input by the user as letters, numerals and chemical pattern sequences, such as $CH_3$, —, and

The error-correction model, based on chemical language rules, organizes the letters, numerals and chemical pattern sequences according to the appearance frequency and connection rules of chemical symbols into:

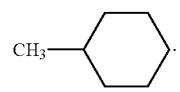

Preferably, the user can predetermine the types of input languages. The stroke decipherment model according to language rules, stroke connection rules and language logic of the selected languages organizes the input into corresponding letters, radicals, numerals or patterns. The error-correction model according to the language logic and rules of the selected language corrects the information output by the stroke decipherment model output so as to recognize it into words, phrases, numeral codes, patterns or formulas conforming to the specific language logic.

The disclosed system for CSI-based fine-grained gesture recognition may be completely formed by hardware. The signal acquisition module 10 comprises antennas and an interface card modeled Intel iwl 5300. The signal processing module 20 comprises one or more of a numeral signal processor, a signal processing IC and a DSP chip. The eigenvalue extraction module 30 is an application-specific integrated chip for analyzing eigenvalues of channel state information. The stroke classifying module 40 is an application-specific integrated chip for organizing strokes into stroke sequences. The letter recognizing module 50 is an application-specific integrated chip for organizing stroke sequences into language characters. The error-correction module 60 is an application-specific integrated chip for correcting errors in characters.

According to a preferred embodiment of the present invention, the eigenvalue extraction module 30 comprises an application-specific integrated chip and a microprocessor. The stroke classifying module 40 comprises an application-specific integrated chip and a microprocessor. The letter recognizing module 50 comprises an application-specific integrated chip and a microprocessor. The error-correction module 60 comprises an application-specific integrated chip and a microprocessor.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A method for CSI-based fine-grained gesture recognition, being characterized in that the method comprises steps of:
   determining a start point, an end point, velocity, direction and/or an inflection point of at least one stroke gesture in multiple dimensions according to an eigenvalue of channel state information;
   classifying strokes according to the start point, the end point, the velocity, the direction and/or the inflection points of the stroke gesture and forming a stroke sequence;
   building a stroke decipherment model according to frequencies of the strokes appearing in natural language rules and/or scientific language rules and/or connection rules between the strokes; and
   dividing and recognizing the stroke sequence as a letter sequence, a radical sequence, a numeral sequence and/or a pattern sequence conforming to the natural language rules and/or the scientific language rules using the stroke decipherment model.

2. The method of claim 1, being characterized in that the method further comprises the following step:
   building an error-correction model according to a logic sequence of the natural language rules and/or the scientific language rules, wherein
   the error-correction model evaluates and corrects the letter sequence, the radical sequence, the numeral sequence and/or the pattern sequence according to the logic sequence, and recognizes the letter sequence, the radical sequence, the numeral sequence and/or the pattern sequence as phrases, words, numeral codes and/or patterns arranged in order.

3. The method of claim 2, being characterized in that the step of determining the direction of the stroke gesture comprises:
   eliminating phase shift using a linear transformation method;
   selecting a signal that contains no multipath effects according to an arrival time of the signal;
   building a CSI data matrix and determining an incidence angle of the signal; and
   determining the direction of the velocity of the stroke gesture according to the incidence angle of the signal, the signal path and the stroke gesture displacement;
   wherein the linear transformation method for eliminating the phase shift is:
   determining a measured phase $\hat{\varphi}_i$ of an $i^{th}$ sub-carrier through $$\hat{\varphi} = \varphi_i - 2\pi \frac{k_i}{N}\delta + \beta + Z;$$

where $\varphi_i$ is a true phase, and $\delta$ is a clock skew at the receiving end of the signal with respect to the transmitting end of the signal, in which the phase shift generated correspondingly is $$-2\pi \frac{k_i}{N}\delta,$$

$\beta$ is a position constant phase shift, Z is measurement noise, $K_i$ is the serial number of the $i^{th}$ sub-carrier, and N is the magnitude of FFT; and
   defining $$a = \frac{\widetilde{\varphi_n} - \widetilde{\varphi_1}}{k_n - k_1} = \frac{\varphi_n - \varphi_1}{k_n - k_1} - \frac{2\pi}{N}\delta$$

$$b = \frac{1}{n}\sum_{j=1}^{n} \varphi_j = \frac{1}{n}\sum_{j=1}^{n} \varphi_j - \frac{2\pi\delta}{nN}\sum_{j=1}^{n} k_j + \beta$$

in case the frequency of the sub-carrier is symmetric, i.e., $\Sigma_{j=1}^{n} k_j = 0$, b is simplified into $$b = \frac{1}{n}\sum_{j=1}^{n} \varphi_j + \beta;$$

and a linear term $ak_i + b$ is subtracted from the measured phase $\hat{\varphi}_i$, so as to eliminate phase shift caused by $\delta$ and $\beta$, thereby obtaining a linear combination of the true phase containing no noise Z, namely $$\tilde{\varphi}_i = \hat{\varphi}_i - ak_i - b = \hat{\varphi}_i - \frac{\varphi_n - \varphi_1}{k_n - k_1}k_i - \frac{1}{n}\sum_{j=1}^{n} \varphi_j.$$

4. The method of claim 3, being characterized in that the method further comprises the following steps:
   establishing a mapping relationship between the variation pattern of the channel state information and the strokes;
   determining corresponding initial strokes according to the variation pattern of the channel state information;
   determining connection relationship between adjacent initial strokes according to start points, end points, velocities, directions and/or the inflection points of the initial strokes, thereby determining the true strokes and types of the true strokes according to the connection relationship.

5. The method of claim 4, being characterized in that the method comprises the following steps:
   determining a multi-dimensional stroke track of the strokes according to the start point, the end point, the stroke time, the velocity, the direction and/or the inflection points of the stroke gesture; and
   determining the true strokes and types thereof according to a matching level between the stroke tracks and the initial strokes.

6. The method of claim 5, being characterized in that:
   in case the matching level between the stroke track and the initial strokes is not smaller than a predetermined threshold, determining the initial strokes as the true strokes; or
   in case the matching level between the stroke track and the initial strokes is smaller than the predetermined threshold, performing stroke analysis according to the start point, the end point, the velocity, the direction and/or the inflection points of the stroke gesture using a machine learning method, then determining the true strokes, and classifying the strokes.

7. The method of claim 6, being characterized in that the step of extracting the eigenvalue of the channel state information comprises:
collecting a first channel state information of at least one sub-carrier;
processing the first channel state information into a second channel state information by means of denoising and/or slicing;
performing multi-dimensional measurement on the second channel state information;
calibrating the second channel state information; and
extracting an eigenvalue of variation in the second channel state information.

8. The method of claim 2, being characterized in that the step of extracting the eigenvalue of the channel state information comprises:
collecting a first channel state information of at least one sub-carrier;
processing the first channel state information into a second channel state information by means of denoising and/or slicing;
performing multi-dimensional measurement on the second channel state information;
calibrating the second channel state information; and
extracting an eigenvalue of variation in the second channel state information.

9. The method of claim 3, being characterized in that the step of extracting the eigenvalue of the channel state information comprises:
collecting a first channel state information of at least one sub-carrier;
processing the first channel state information into a second channel state information by means of denoising and/or slicing;
performing multi-dimensional measurement on the second channel state information;
calibrating the second channel state information; and
extracting an eigenvalue of variation in the second channel state information.

10. The method of claim 4, being characterized in that the step of extracting the eigenvalue of the channel state information comprises:
collecting a first channel state information of at least one sub-carrier;
processing the first channel state information into a second channel state information by means of denoising and/or slicing;
performing multi-dimensional measurement on the second channel state information;
calibrating the second channel state information; and
extracting an eigenvalue of variation in the second channel state information.

11. The method of claim 5, being characterized in that the step of extracting the eigenvalue of the channel state information comprises:
collecting a first channel state information of at least one sub-carrier;
processing the first channel state information into a second channel state information by means of denoising and/or slicing;
performing multi-dimensional measurement on the second channel state information;
calibrating the second channel state information; and
extracting an eigenvalue of variation in the second channel state information.

12. The method of claim 1, being characterized in that the step of extracting the eigenvalue of the channel state information comprises:
collecting a first channel state information of at least one sub-carrier;
processing the first channel state information into a second channel state information by means of denoising and/or slicing;
performing multi-dimensional measurement on the second channel state information;
calibrating the second channel state information; and
extracting an eigenvalue of variation in the second channel state information.

13. The method of claim 12, being characterized in that, the step of extracting the eigenvalue of variation in the second channel state information comprises:
performing inverse Fourier transform on at least one said second channel state information; and
extracting an eigenvalue of at least one stroke gesture using a discrete wavelet transform method.

14. A system for CSI-based fine-grained gesture recognition, being characterized in that the system at least comprises:
a signal acquisition module (10), an eigenvalue extraction module (30), a stroke classifying module (40) and a letter recognizing module (50), wherein
the signal acquisition module (10) collects channel state information (CSI),
the eigenvalue extraction module (30) extracts an eigenvalue of the channel state information;
the stroke classifying module (40) determines a start point, an end point, a velocity, a direction and/or an inflection point of at least one stroke gesture in multiple dimensions according to the eigenvalue of channel state information, and
the stroke classifying module (40) classifies strokes according to the start point, the end point, the velocity, the direction and/or the inflection points of the stroke gesture using a machine learning method and forms a stroke sequence;
the letter recognizing module (50) has a stroke decipherment model built according to frequencies of the strokes appearing in natural language rules and/or scientific language rules and/or connection rules between the strokes; and
the letter recognizing module (50) determines a start point, an end point, a velocity, a direction and/or an inflection point of at least one stroke gesture in multiple dimensions according to the eigenvalue of channel state information, and divides and recognizes the stroke sequence as a letter sequence, a radical sequence, a numeral sequence and/or a pattern sequence conforming to the natural language rules and/or the scientific language rules using the stroke decipherment model.

15. The system of claim 14, being characterized in that the system further comprises an error-correction module (60),
wherein the error-correction module (60) has an error-correction model built according to logic sequences of the natural language rules and/or the scientific language rules, wherein the error-correction module (60) evaluates and corrects the letter sequences, radical sequences, numeral sequences and/or pattern sequences according to the logic sequences, and recognizes the letter sequences, radical sequences, numeral sequences and/or pattern sequences as phrase, words, numeral codes and/or patterns that are arranged in order.

\* \* \* \* \*